3,057,652
STORE SUPPORT AND EJECTOR SHACKLE
Ted Geffner, 3825 Hampton Road, Pasadena, Calif., and Ernest Costa, 4319 Gunther Ave., New York, N.Y.
Filed Dec. 4, 1957, Ser. No. 700,681
1 Claim. (Cl. 294—83)

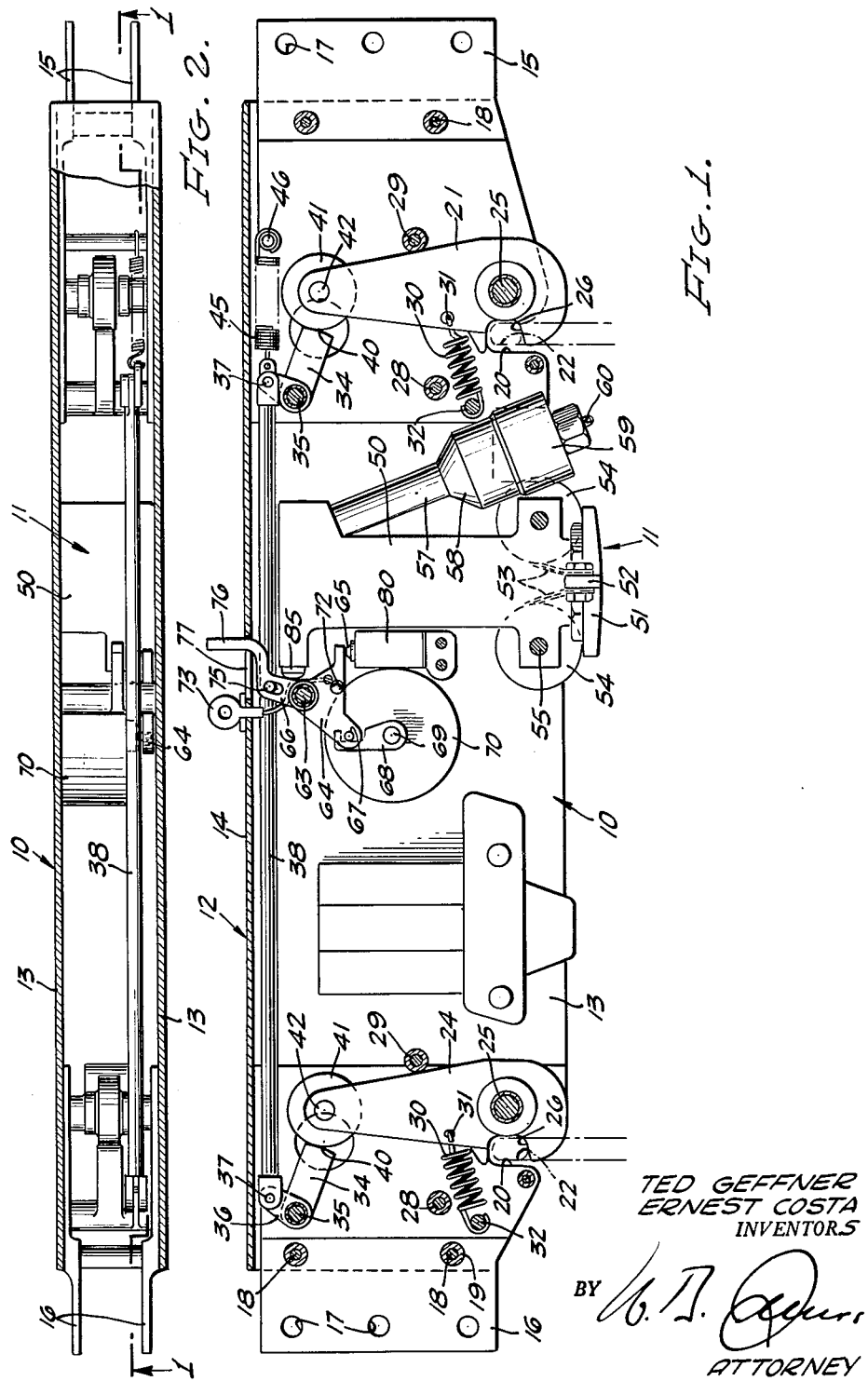

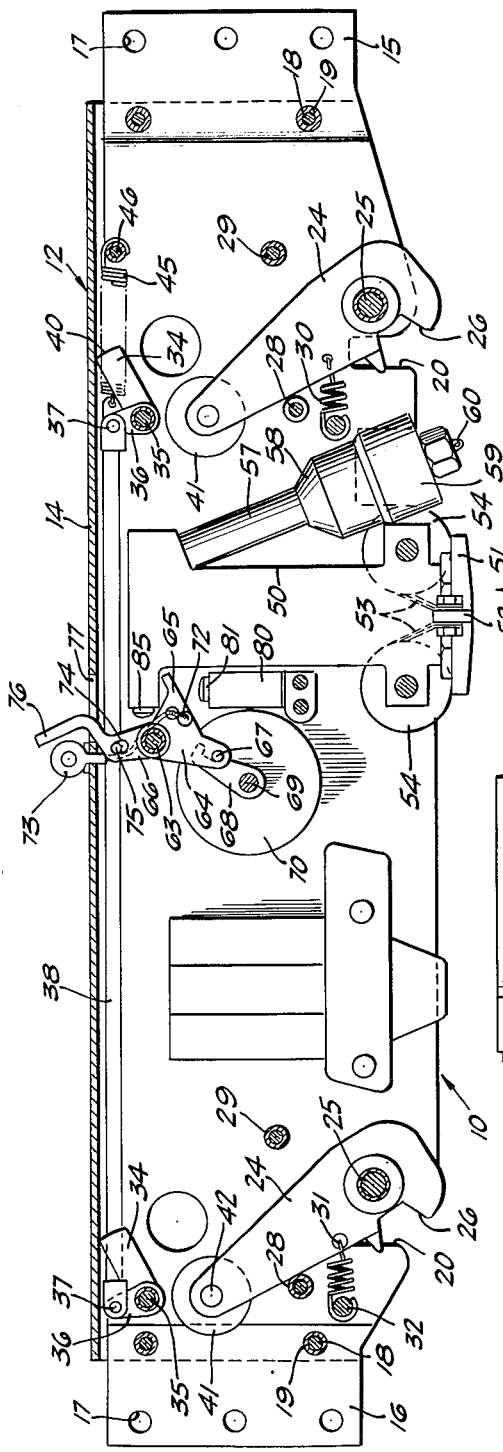
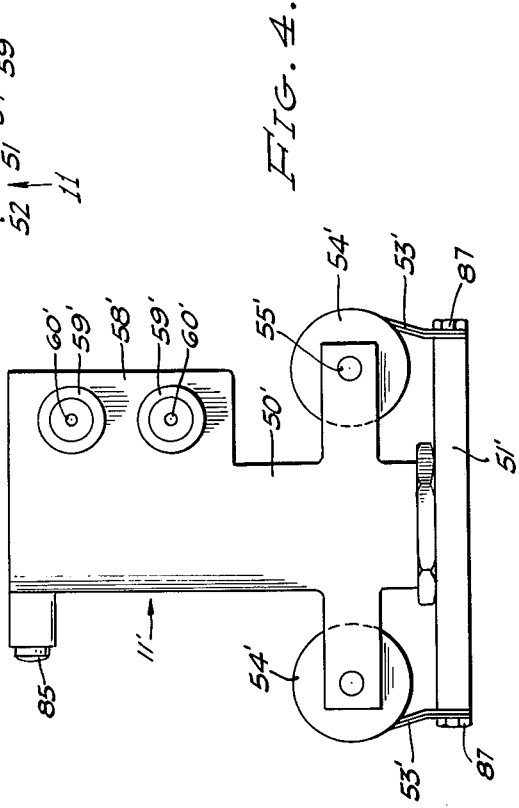
FIG. 3.
FIG. 4.
TED GEFFNER
ERNEST COSTA
INVENTORS
BY
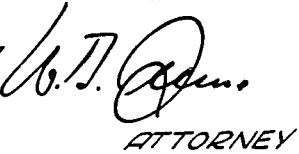
ATTORNEY United States Patent Office 3,057,652
Patented Oct. 9, 1962

This invention relates to store ejection devices and more particularly to a combined store support and ejector shackle for use on aircraft, particularly of the military type, and by means of which stores such as bombs, missiles, incendiary devices, fuel tanks and the like may be positively locked to the craft until such time as it is desired to release and forcibly jettison the same from the craft.

Devices of the type referred to have been proposed in various forms heretofore. Although some of these have enjoyed commercial usage, they are subject to many disadvantages and leave much to be desired as respects reliability of operation, freedom from malfunctioning, flexibility of operation and other important performance characteristics. The present application represents marked improvements particularly in the simplification of the shackle mechanism over our prior device disclosed and claimed in our co-pending application for United States Letters Patent, Serial No. 503,480, filed April 25, 1955, entitled Store Supporting and Discharging Rack for Aircraft, now abandoned; and in our later filed application, Serial No. 680,033, filed August 22, 1957, entitled Store Supporting and Ejecting Assembly for Aircraft. This application constitutes a continuation-in-part of said two applications. The shackle construction herein disclosed, while intended to serve the same purposes as those of the aforesaid earlier applications, features greater simplicity, is more positive in operation and avoids the need for the critical tolerance requirements of our earlier designs. The marked simplification in structure makes possible substantial cost savings, greater certainty and positiveness of action, less maintenance and greater compactness.

Accordingly, it is a primary object of the present invention to provide an improved and simplified store support and ejector mechanism particularly adapted for use on aircraft in ejecting missiles, fuel tanks, jet assisting take-off devices and the like from the craft while in high speed flight.

Another object of the invention is the provision of a combined store supporting shackle and ejector of compact low-cost design and which is positive and reliable in operation.

Another object of the invention is the provision of a new and compact shackle assembly for use in the release of stores from aircraft and the like, and characterized by the provision of selectively operable means for activating the release and ejection of a store therefrom.

These and other more specific objects will appear upon reading the following specification and claim and upon considering in connection therewith the attached drawings to which they relate.

Referring now to the drawings in which preferred embodiments of the invention are illustrated:

FIGURE 1 is a longitudinal sectional view taken vertically through one embodiment of the shackle mechanism along line 1—1 on FIGURE 2 and showing the position of parts while locked in store-supporting position;

FIGURE 2 is a top plan view of the mechanism with a portion of the main frame broken away to show the position of enclosed therewithin parts;

FIGURE 3 is a view similar to FIGURE 1 but showing the position of parts after the store has been ejected and the plunger of the ejector has been retracted; and FIGURE 4 is a side elevational view of the ejector mechanism of an alternate embodiment of this sub-component.

Referring to the drawings there is shown in FIGURES 1 and 2 a store-supporting shackle mechanism designated generally 10 and a power driven store ejector designated generally 11 held assembled in one compact unit. Main frame 12 of the mechanism comprises an elongated U-shaped member having side walls 13, 13 extending downwardly from a generally horizontal bight portion 14. Rigidly secured and projecting from the opposite ends of side walls 13 are bracket clips 15 and 16 provided with holes 17 for securing the mechanism rigidly to the frame work of an aircraft, as for example, the wing or the bomb bay structure. Interconnecting side walls 13 are crossbolts 18 each surrounded by a spacer sleeve 19 effective in holding the side walls spaced apart and parallel to one another.

Each of side plates 13 is notched upwardly from its lower edge as indicated at 20, 20 to receive the mounting eyelets or hooks 22, 22 anchored at spaced intervals along a load to be carried such as a bomb, an incendiary bomb, a missile, a jettisonable fuel tank or the like, it being understood that these are herein characterized generally as a store. It will be understood that hooks 22 are appropriately spaced apart along the store so as to be received by notches 20, 20 of shackle device 10.

The means for holding the hooks 22 releasably but positively engaged in notches 20, 20 comprises a pair of latch levers 24, 24 pivotally supported between sides 13 of the shackle frame on pivot pins 25. Latch levers 24 have notches 26 opening laterally through one side of the levers opposite pivot pins 25 and in position to register with notches 20, 20. When the latch levers are in their closed position, as illustrated in FIGURE 1, notches 20 and 26 cooperate to hold the store hooks 22 firmly locked to the shackle mechanism. However, rotation of levers 24 counterclockwise through an arc of approximately 45 degrees or less is sufficient to move the notches out of register therey releasing eyelets 22 and the store to which the latter are anchored. A pair of stops provided by spacer pins 28 and 29 mounted between face plates 13, 13 limit the pivotal movement of the levers, pin 28 limiting the opening movement and pin 29 serving as a back-stop against which the levers are held in their closed, store-holding position. Levers 24 are normally urged toward open position by a tension spring 30 having one end 31 anchored on the lever and the other end engaged about a cross pin 32.

Linkage means functioning to hold the levers 24 locked in their closed position and illustrated in FIGURE 1, comprises a pair of bell cranks 34 pivotally supported on cross pins 35 with their shorter arms 36 pivotally connected at 37 to the slotted opposite ends of a rigid connecting link 38 extending lengthwise of the frame directly beneath bight portion 14. The rounded forward ends 40 of the longer arms of the bell cranks 34 which function as catches, are positioned to engage the surface of rollers 41 rotatably supported on pins 42 carried in the outer ends of latch levers 24. It is pointed out that the point of contact between rollers 41 and the rounded ends of bell cranks 34 lies on a point spaced slightly below a line connecting the axes of an associated roller 41 and pivot pin 35 with levers 24 backed against stop pin 29. In consequence a positive force must be applied to rotate bell cranks 34 counterclockwise. A tension spring 45 is connected to one of the bell cranks 34 and its other end is anchored to the shackle frame as by pin 46. Accordingly, spring 45 is effective to urge the bell cranks and linkage link 38 clockwise and toward the normal locking position of the linkage illustrated in FIGURE 1. Means to be described presently are provided preventing clockwise movement beyond the locking position shown, the normal arc of movement of the linkage being restricted to the arc between the two extreme positions shown in FIGURES 1 and 3.

Reference will now be had to power-operated means 11 for forcibly and rapidly ejecting the store from the shackle immediately following its release from its locked position in notches 20, 20. It will be recognized that the ejector is preferably of the multiple stage, telescoping tubular type such as that described in the above-identified co-pending application Serial No. 680,033, and reference may be had to the disclosure therein for a more detailed understanding of its structure. Ejector mechanism 11 is rigidly mounted between side plates 13, 13 of the shackle frame and includes an outer casing 50 closed at its upper end and slidably supporting one or more telescoping tubes, these normally being collapsed within housing 50 but understood to be extendable downwardly as viewed in FIGURE 1 when acting to eject a store. For the latter purpose, the end of the inner tubular member has rigidly secured to its outer end a pusher plate 51 of suitable construction and size. This plate is preferably provided with tabs 52 to which are secured one end of conventional negator springs 53, the upper ends of the springs being coiled on spools 54 supported on pins 55 carried in brackets of the ejector housing. As is well known, negator springs 53 are effective to provide a substantially constant-tension retractile force on the ejection plungers and tend to maintain the latter fully retracted within housing 50 while permitting it to extend quickly and to a maximum extent during ejection of the store. A similar retraction assembly is disclosed in the aforesaid earlier filed application Serial No. 680,033.

Extending downwardly and communicating with the upper end of the ejector housing is a tube 57 opening into an explosive charge-containing chamber 58 normally closed by a removable end cap 59. This cap is fitted with a charge detonator mechanism of any suitable form 60 to which an electrical wire of suitable firing mechanism may be attached in known manner.

The means for selectively coordinating the operation of the locking linkage mechanism and of the ejector comprises a pivot pin 63 pivotally supporting thereon three rigidly interconnected, generally radial levers 64, 65 and 66. Projecting laterally from lever 64 is a pin 67 lying in the path of hooked arm 68 fixed to rotatably supported armature 69 of a stepping relay 70, that is, a relay which operates when energized to rotate the armature clockwise through a small arc. Fixed to arm 65 is a pin 72 forming an anchor for a cable 71 having a looped end 73 projecting loosely through an opening 14 of shackle frame. This cable may extend over pulleys to a remote operator station situated at any point in the plane, it being understood that a pull on the cable operates to rotate arm 65 counterclockwise.

The remaining arm 66 has a slot 74 seating the end of a pin 75 fixed to the side of linkage rod 38. An L-shaped extension 76 of arm 66 projects through an opening 77 in the shackle frame and constitutes a lever by which the releasing mechanism may be manually actuated.

Further coordinating the action of the release linkage with the operation of the ejector and playing an important role therein is a switch 80 rigidly anchored to the shackle frame and having an operating button 81 projecting from its upper end into the path of arm 65. In the locked position of the mechanism, shown in FIGURE 1, arm 65 is positioned to hold switch button 81 depressed and the switch 80 open.

It will be understood that the several operations described immediately above are individually operable to effectuate the operation of the store release and then, of the store ejector. For example, solenoid coil 70 may be and preferably is connected in circuit with detonator 60 and a switch controlling the source of power supply whereby closing of the switch acts to energize coil 70 thereby rotating armature 68 clockwise and releasing the store mechanism simultaneously with the detonation of the charge for activating store ejector 11.

According to another mode of operation, cable loop 73 can be pulled thereby rotating arm 65 counterclockwise along with linkage 38 and bell crank 34 to unlock latch levers 24 as switch 80 is closed to detonate the explosive charge for activating the ejector 11. Thirdly, manually operable lever 76 can be shifted to the left as viewed in FIGURE 1 to elevate lever 65 and close switch 80 to detonate the charge as latch levers 24 are pivoted counterclockwise to release the store. According to still a fourth mode of operation, the device is activated from a remote switch operating to energize detonator 60. The detonation of the charge creates a high pressure within the ejector housing, this pressure being effective to extend the small-diameter normally-retracted plunger 85 at the upper left corner of the ejector against lever 66 and moving linkage 38 to the left to release the store.

The overall operation of the device will be quite apparent from the foregoing detailed description of the individual components. The loading of a store such as a bomb in the shackle mechanism is accomplished while the mechanism parts are in the position shown in FIGURE 3. Under these conditions both latch levers are pivoted fully counterclockwise with the entrance to notches 20 and 26 opening downwardly. The store is then elevated into registry with notches 20, 20. As the top of eyelets 22, 22 engage the upper edge of notch 26, levers 24 are pivoted clockwise to their closed positions with the lower edge of notches 26 engaged through the eyelets. At the start of the described operation, spring 45 acts to hold bell cranks 34 pivoted clockwise with the longer arm of each extending downwardly to the right and resting against the top of rollers 41. Movement of levers 24 clockwise elevates the bell cranks until finally the rounded end 40 bypasses the rollers 41 to the left side thereof allowing spring 45 to pivot linkage 34, 38 clockwise until arrested by the full opening of switch 80 and the full retraction of plunger 85. In this arrested position, the point of contact between the bell crank and roller 41 lies slightly below a direct line between the axis of pin 35 and of pivot pin 42.

A final assembly task is the placing of a cartridge of explosive material in chamber 58, closing cover 59 and connecting the energizing wires to detonator 60.

Release of the store and its forcible ejection from the plane at high speed is initiated in any one of the ways referred to above as, for example, by energizing the stepping relay 70, or by pulling upwardly on cable 73, or by manually shifting lever 76 to the left, or by merely energizing the detonator by closing an electrical switch. Irrespective of which mode of activation is selected the same end results are achieved. In all cases, the linkage 34, 38 is shifted to move bell crank 34 counterclockwise past the clearance point allowing the weight of the store to rotate latch lever 24 counterclockwise. The detonation of the charge generates a large quantity of high pressure gas which is communicated through tube 57 into the top of the ejector cylinder forcing the plunger and plate 51 downwardly against the underlying store pushing it away from the shackle mechanism at high speed and with much force. As this occurs negator springs 53 are extended along with the telescoped stages of the ejector mechanism. Following complete extension of the ejector and the venting of the products of combustion from the cartridge, springs 53 retract the tublar members until plate 51 is again seated across the lower end of the main casing. Immediately following the release of latch levers 24, spring 45 pulls linkage 38 to the right restoring these parts to the position shown in FIGURE 1 where they remain until the craft returns to its base and another store is locked in place following the procedure described above.

If desired, the alternate ejector mechanism assembly shown in FIGURE 4 may be installed in lieu of ejector 11. The corresponding parts of the alternate construction are designated by the same reference characters as used above but distinguished by the addition of a prime. It will be understood that, in general, this ejector may have internal components identical with those of the first described embodiment and that the parts are otherwise similar in structure and function. End plate 51' rigidly secured to the lower end of the extensible component of the ejector is somewhat larger and negator springs 53' are spaced outwardly further from the longitudinal axis of the ejector. Furthermore, the lower ends of springs 53' are attached to plate 51' at widely spaced points as by cap screws 87, this point of attachment being substantially directly below the point of contact with spools 54'.

Another major difference is the location of the charge containing chamber 58' laterally to one side of main casing 50'. This chamber is integral with the main casing and is provided with cartridge receiving chambers provided with removable covers 59' accessible through openings in side plates 13 of the shackle frame. It will be recognized that the described charge chamber communicates with the upper end of the ejector and with the inner end of piston 85 employed to operate the store release linkage. The ejector gun of FIGURE 4 operates generally in the same manner described above in connection with the first embodiment.

While the particular combined store supporting shackle and power driven ejector mechanism herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

We claim:

Store carrying and ejecting means for use on aircraft and the like comprising, a main frame having a pair of store supporting latch devices adapted when in locked position to lock a store releasably to said frame, means biasing said devices toward open position in readiness to close as a store is pressed into engagement therewith. roller means carried by said locking devices, catches cooperable with said roller means to lock said latch devices positively closed automatically as said latch devices are moved closed by the pressing of a store thereagainst and explosive charge means for opening said catches and releasing said store simultaneously from both of said latching devices.

References Cited in the file of this patent

UNITED STATES PATENTS

| | | |
|---|---|---|
| 2,435,639 | Stockton | Feb. 10, 1948 |
| 2,466,980 | Bronson | Apr. 12, 1949 |
| 2,491,400 | Thumin | Dec. 13, 1949 |
| 2,534,745 | Wardwell | Dec. 19, 1950 |
| 2,749,063 | Low | June 5, 1956 |
| 2,756,091 | Komerska | July 24, 1956 |
| 2,822,207 | Steinmetz et al. | Feb. 4, 1958 |
| 2,869,426 | Wilkie | Jan. 20, 1959 |